United States Patent
Schoeny et al.

(10) Patent No.: US 10,477,757 B2
(45) Date of Patent: Nov. 19, 2019

(54) DUAL-DISK SEED METER FOR MULTI-VARIETY SEED PLANTING

(71) Applicant: CNH Industrial America, LLC, New Holland, PA (US)

(72) Inventors: Christopher Schoeny, Yorkville, IL (US); Brian Anderson, Yorkville, IL (US); Chad M. Johnson, Arlington Heights, IL (US)

(73) Assignee: CNH Industrial America LLC, New Holland, PA (US)

(*) Notice: Subject to any disclaimer, the term of this patent is extended or adjusted under 35 U.S.C. 154(b) by 63 days.

(21) Appl. No.: 15/689,058

(22) Filed: Aug. 29, 2017

(65) Prior Publication Data

US 2019/0059207 A1 Feb. 28, 2019

(51) Int. Cl.
| | | |
|---|---|---|
| A01C 7/08 | (2006.01) | |
| A01C 7/16 | (2006.01) | |
| A01C 7/20 | (2006.01) | |
| A01C 19/04 | (2006.01) | |
| A01C 15/00 | (2006.01) | |
| A01C 5/06 | (2006.01) | |
| A01C 7/04 | (2006.01) | |

(52) U.S. Cl.
CPC ............... *A01C 7/082* (2013.01); *A01C 5/06* (2013.01); *A01C 7/046* (2013.01); *A01C 7/166* (2013.01); *A01C 7/203* (2013.01); *A01C 15/006* (2013.01); *A01C 19/045* (2013.01)

(58) Field of Classification Search
CPC ........... A01C 7/082; A01C 7/081; A01C 7/08; A01C 7/00; A01C 5/06; A01C 5/00; A01C 7/166; A01C 7/16; A01C 7/203; A01C 7/201; A01C 7/20; A01C 15/006; A01C 15/005; A01C 15/00; A01C 19/045; A01C 19/04; A01C 19/00; A01C 7/046; A01C 7/044; A01C 7/042; A01C 7/04
See application file for complete search history.

(56) References Cited

U.S. PATENT DOCUMENTS

| | | |
|---|---|---|
| 6,516,733 B1 | 2/2003 | Sauder et al. |
| 6,748,885 B2 | 6/2004 | Sauder et al. |
| 9,526,201 B2 | 12/2016 | Wendte et al. |
| 9,603,299 B2 | 3/2017 | Wendte et al. |
| 9,622,402 B2 | 4/2017 | Kinzenbaw et al. |
| 2015/0351315 A1 | 12/2015 | Wendte et al. |

(Continued)

FOREIGN PATENT DOCUMENTS

WO  WO 2015/168198   11/2015

*Primary Examiner* — Christopher J. Novosad
(74) *Attorney, Agent, or Firm* — Rebecca L. Henkel; Rickard K. DeMille

(57) ABSTRACT

A dual-disk seed meter for a planter may include a housing defining a first seed chamber configured to receive first seeds of a first seed type and a second seed chamber configured to receive second seeds of a second seed type. The seed meter may also include a first seed disk rotatable within the housing to convey the first seeds from the first seed chamber, a second seed disk rotatable within the housing to convey the second seeds from the second seed chamber, and a drive assembly configured to simultaneously rotate the first and second seed disks. In addition, the seed meter may include a seed deflector movable relative to the first seed disk and/or the second seed disk to control which of the seed types is discharged from the housing based on a selected seed type to be delivered by the seed meter.

20 Claims, 8 Drawing Sheets

(56) References Cited

U.S. PATENT DOCUMENTS

| | | |
|---|---|---|
| 2016/0037713 A1 | 2/2016 | Wendte et al. |
| 2016/0128268 A1 | 5/2016 | Garner et al. |
| 2016/0165794 A1 | 6/2016 | Czapka et al. |
| 2016/0302353 A1 | 10/2016 | Wendte et al. |
| 2017/0034995 A1 | 2/2017 | Wilhelmi et al. | ial-disk seed meter for
DUAL-DISK SEED METER FOR MULTI-VARIETY SEED PLANTING

FIELD OF THE INVENTION

The present subject matter relates generally to row-crop planters or seeders and, more particularly, to a dual-disk seed meter for use with a planter for performing multi-variety planting operations as well as related systems and methods utilizing the disclosed dual-disk seed meter.

BACKGROUND OF THE INVENTION

Modern farming practices strive to increase yields of agricultural fields. Technological advances in the area of planting implements or planters allow for better agronomic characteristics at the time of planting, such as providing more accurate seed depth, improved uniformity of seed depth across the planter, and improved accuracy of in-row seed spacing. However, a single field can have performance inconsistencies between different areas of the field. That is because a field can have a wide variety of soil types and management zones, such as irrigated and non-irrigated zones in different areas. To address this issue, seed companies have developed multiple varieties of each of their seed product types, with the different varieties offering improved performance characteristics for different types of soil and management practices.

In this regard, efforts have been made to plant multiple varieties of a particular seed product type in different areas of fields with different soil types or management zones. For example, planters have been developed that include separate bulk fill hoppers for different seed varieties and that require the reservoir for each seed meter be completely cleaned out or planted out before a different seed variety can be delivered to the seed meters. However, it is often quite difficult to determine when a given seed meter has been completely emptied of seeds to allow a new seed type to be delivered to the meter. Alternatively, planters have been developed that allow for planting of two different seed varieties within each row by including two separate and distinct seed meters at every row unit. Unfortunately, the inclusion of two separate and distinct seed meters at each row unit significantly increases the cost and complexity of the associated planter.

Accordingly, an improved seed meter that allows for more efficient and accurate switching between seed varieties or types when performing a planting operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a dual-disk seed meter for a planter. The seed meter may include a housing defining a first seed chamber configured to receive a plurality of first seeds of a first seed type and a second seed chamber configured to receive a plurality of second seeds of a second seed type. The seed meter may also include a first seed disk rotatable within the housing to convey the first seeds from the first seed chamber, a second seed disk rotatable within the housing to convey the second seeds from the second seed chamber, and a drive assembly configured to simultaneously rotate the first and second seed disks relative to the housing. In addition, the seed meter may include a seed deflector movable relative to at least one the first seed disk or the second seed disk to control which of the first and second seed types is discharged from the housing based on a selected seed type to be delivered by the seed meter.

In another aspect, the present subject matter is directed to a system for switching between seed types during a planting operation. The system may include a seed meter having a housing defining a first seed chamber configured to receive a plurality of first seeds of a first seed type and a second seed chamber configured to receive a plurality of second seeds of a second seed type. The seed meter may also include a first seed disk rotatable within the housing to convey the first seeds from the first seed chamber and a second seed disk rotatable within the housing to convey the second seeds from the second seed chamber. The system may also include a seed deflector positioned within the housing and movable relative to at least one the first seed disk or the second seed disk and a controller configured to control movement of the seed deflector within the housing based on a selected seed type to be discharged from the seed meter. When the selected seed type is the first seed type, the controller is configured to move the seed deflector to a first position such that the first seeds remain coupled to the first seed disk as the first seeds are conveyed past the seed deflector with rotation of the first seed disk. When the selected seed type is the second seed type, the controller is configured to move the seed deflector to a second position such that the first seeds conveyed towards the seed deflector with rotation of the first seed disk contact the seed deflector and fall back down into the first seed chamber.

In a further aspect, the present subject matter is directed to a method for switching between seed types during a planting operation. The method may include rotating first and second seed disks within a housing of a seed meter, wherein the housing defines a first seed chamber configured to receive a plurality of first seeds of a first seed type and a second seed chamber configured to receive a plurality of second seeds of a second seed type. The first seed disk is rotated to convey the first seeds from the first seed chamber and the second seed disk is rotated to convey the second seeds from the second seed chamber. The method may also include positioning at least one seed deflector within the housing such that the first seeds remain coupled to the first seed disk for discharge from the seed meter and the second seeds contact the at least one seed deflector and fall back down into the second seed chamber. Additionally, the method may include adjusting the position of the at least one seed deflector within the housing when switching from the first seed type to the second seed type such that the second seeds remain coupled to the second seed disk for discharge from the seed meter and the first seeds contact the at least one seed deflector and back down into the first seed chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
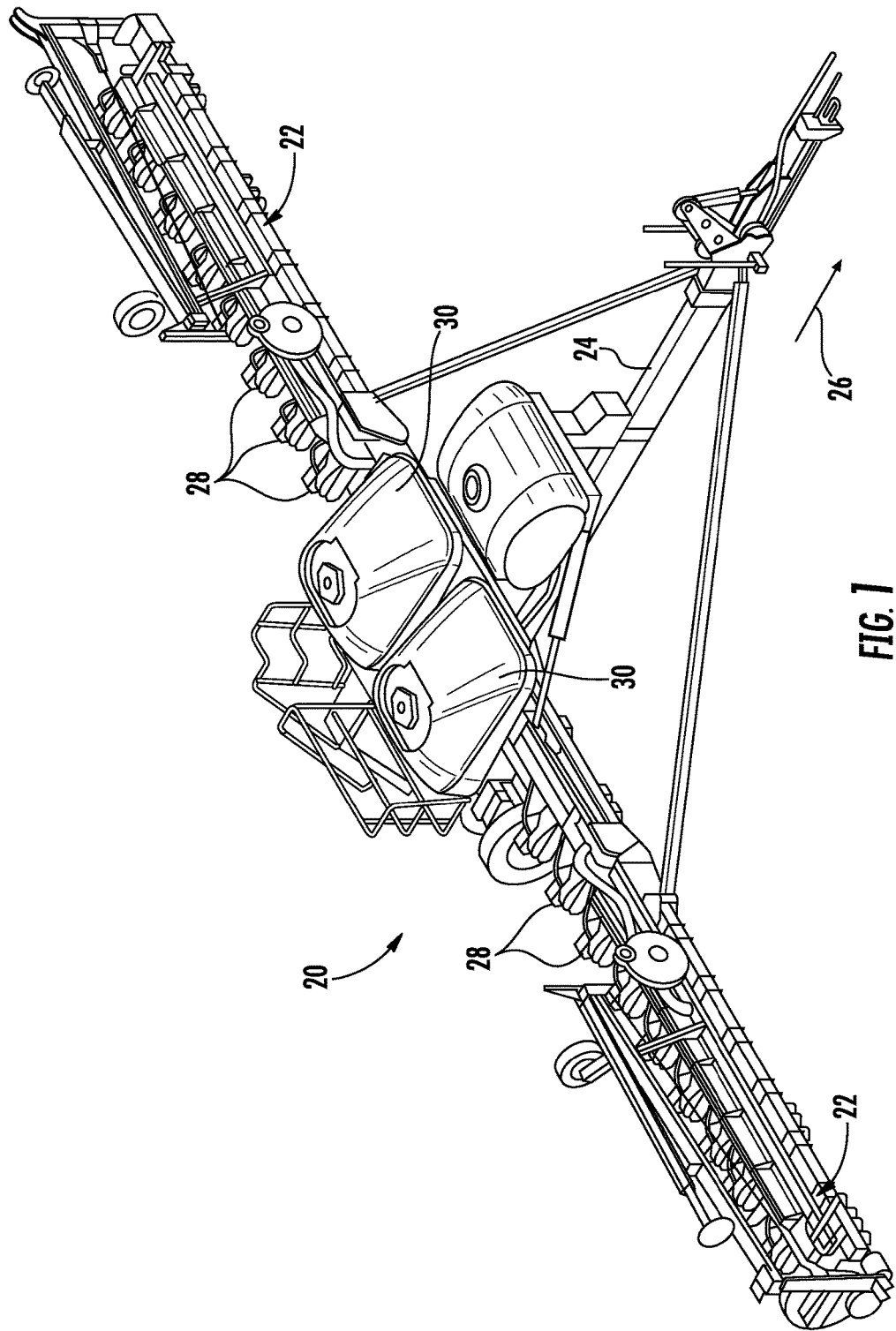
FIG. 1 illustrates a perspective view of one embodiment of a planter in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a dual-disk seed meter that allows for absolute and instantaneous switching of seed types being planted (e.g., during a single planting pass) without requiring either multiple seed meters at every row unit or emptying or planting out of a first seed type before switching to a different seed type. Specifically, in several embodiments, the seed meter may include an outer housing and first and second seed disks positioned within the housing. The first seed disk may be configured to convey seeds of a first seed type from a first seed chamber defined in the housing towards a seed discharge outlet of the seed meter. Similarly, the second seed disk may be configured to convey seeds of a second seed type from a second seed chamber defined in the housing towards the seed discharge outlet of the seed meter.

Additionally, the disclosed seed meter may also include one or more seed deflectors configured to be positioned relative to the seed disks in order to regulate or control which seed type is actually delivered to the seed discharge outlet for subsequent discharge from the seed meter. Specifically, when it is desired to plant seeds of the first seed type, the seed deflector(s) may be positioned within the housing so as to allow the seeds conveyed by the first seed disk to pass by the seed deflector(s) for delivery to the seed discharge outlet while preventing the seeds conveyed by the second seed disk from passing by the seed deflector(s) (e.g., by knocking the seeds of the second seed type off of the second seed disk). Similarly, when it is desired to plant seeds of the second seed type, the seed deflector(s) may be positioned within the housing so as to allow the seeds conveyed by the second seed disk to pass by the seed deflector(s) for delivery to the seed discharge outlet while preventing the seeds conveyed by the first seed disk from passing by the seed deflector(s) (e.g., by knocking the seeds of the first seed type off of the first seed disk). As a result, by adjusting the position of the seed deflector(s) relative to the seed disks, the seed type being planted via the seed meter can be instantaneously and automatically switched.

It should be appreciated that, in several embodiments, the present subject matter is also directed to a system and associated method for switching between seed types during the performance of a planting operation. For example, in one embodiment, the system may include a seed meter configured in accordance with the disclosed provided herein and a controller configured to regulate the position of the seed deflector(s) of the seed meter to ensure that a desired or selected seed type is being discharged from the seed meter. In such an embodiment, the controller may be configured to automatically adjust the position of the seed deflector(s)

relative to the seed disks to absolutely and instantaneously switch between seed types as a planting operation is being performed within a field.

Referring now to drawings, FIG. 1 illustrates a perspective view of one embodiment of a planting implement or planter 20 in accordance with aspects of the present subject matter. As shown in FIG. 1, the planter 20 may include a laterally extending toolbar or frame assembly 22 connected at its middle to a forwardly extending tow bar 24 to allow the planter 20 to be towed by a work vehicle (not shown), such as an agricultural tractor, in a direction of travel (e.g., as indicated by arrow 26). The frame assembly 22 may generally be configured to support a plurality of seed planting units (or row units) 28. As is generally understood, each row unit 28 may be configured to deposit seeds at a desired depth beneath the soil surface and at a desired seed spacing as the planter 20 is being towed by the work vehicle, thereby establishing rows of planted seeds. In some embodiments, the bulk of the seeds to be planted may be stored in one or more seed tanks 30. Thus, as seeds are planted by the row units 28, a pneumatic distribution system may distribute additional seeds from the seed tanks 30 to the individual row units 28. Additionally, as will be described below, each row unit 28 may also include one or more individual seed hoppers for locally storing seeds at the row unit 28.

It should be appreciated that, for purposes of illustration, only a portion of the row units 28 of the planter 20 have been shown in FIG. 1. In general, the planter 20 may include any number of row units 28, such as 6, 8, 12, 16, 24, 32, or 36 row units. In addition, it should be appreciated that the lateral spacing between row units 28 may be selected based on the type of crop being planted. For example, the row units 28 may be spaced approximately 30 inches from one another for planting corn, and approximately 15 inches from one another for planting soybeans.

It should also be appreciated that the configuration of the planter 20 described above and shown in FIG. 1 is provided only to place the present subject matter in an exemplary field of use. Thus, it should be appreciated that the present subject matter may be readily adaptable to any manner of planter configuration.

Figure 2:
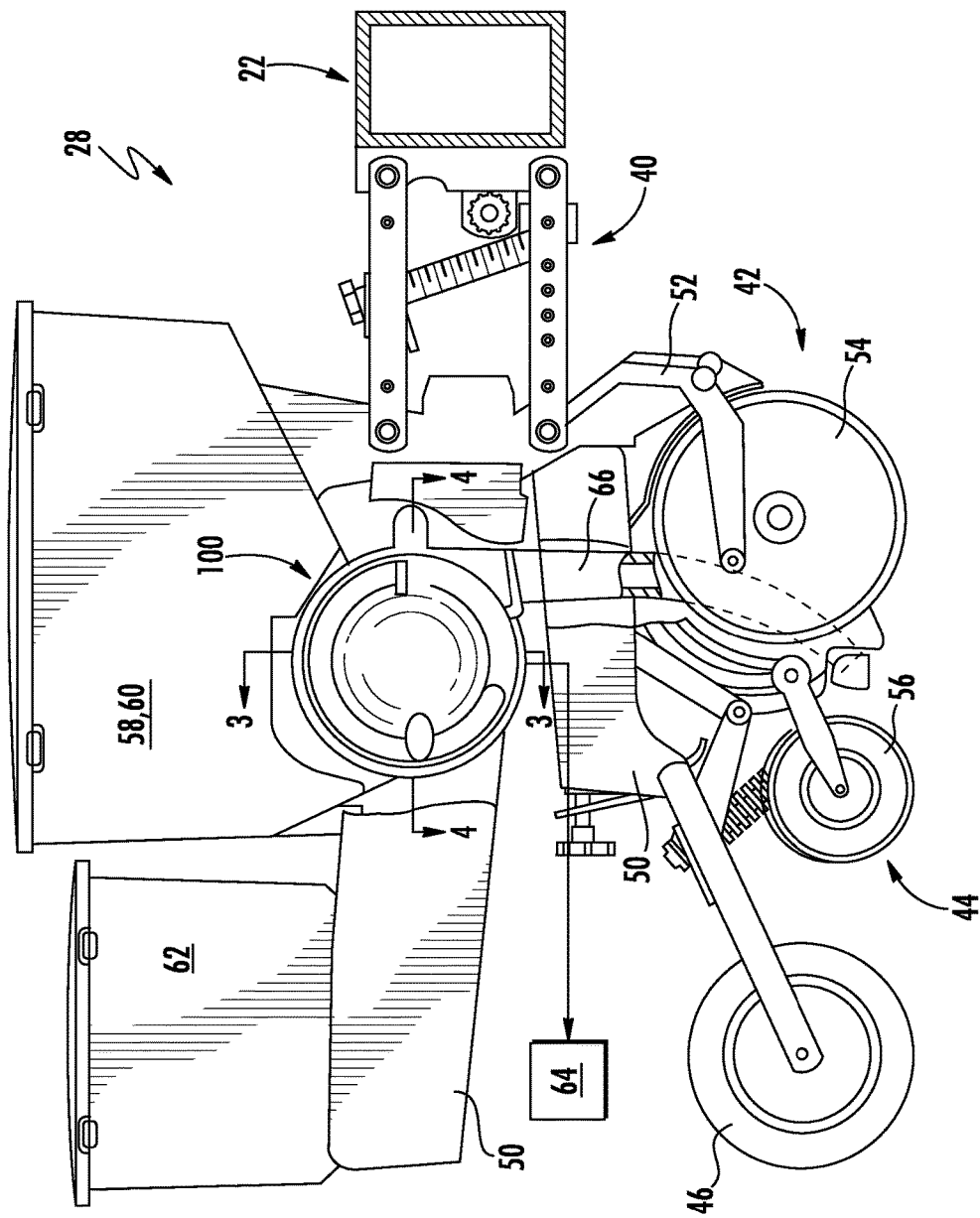
FIG. 2 illustrates a side view of one embodiment of a row unit suitable for use with a planter in accordance with aspects of the present subject matter.

Referring now to FIG. 2, a side view of one embodiment of a row unit 28 is illustrated in accordance with aspects of the present subject matter. As shown, the row unit 28 includes a linkage assembly 40 configured to mount the row unit 28 to the toolbar or frame assembly 22 of the planter 20. As shown in FIG. 2, the row unit 28 also includes a furrow opening assembly 42, a furrow closing assembly 44, and a press wheel 46. In general, the furrow opening assembly 42 may include a gauge wheel (not shown) operatively connected to a frame 50 of the row unit 28 via a support arm 52. Additionally, the opening assembly 42 may also include one or more opening disks 54 configured to excavate a furrow, or trench, in the soil. As is generally understood, the gauge wheel may be configured to engage the surface of the field, with the height of the opening disk(s) 54 being adjusted with respect to the position of the gauge wheel to set the desired depth of the furrow being excavated. Moreover, as shown, the furrow closing assembly 44 may include a closing disk(s) 56 configured to close the furrow after seeds have been deposited into the furrow. The press wheel 46 may then be configured to roll over the closed furrow to firm the soil over the seed and promote favorable seed-to-soil contact.

Additionally, as shown in FIG. 2, the row unit 28 may include one or more seed hoppers 58, 60 and, optionally, a granular chemical product hopper 62 supported on the frame 50. In general, the seed hopper(s) 58, 60 may be configured to store seeds to be gravitationally deposited within the furrow as the row unit 28 moves over and across the field. For instance, in accordance with aspects of the present subject matter, the row unit 28 may include a first seed hopper 58 configured to store seeds of a first seed type and a second hopper 60 configured to store seeds of a second seed type.

Moreover, in accordance with aspects of the present subject matter, the row unit 28 may include a dual-disk seed meter 100 provided in operative association with the seed hopper(s) 58, 60. In general, the seed meter 100 may be configured to uniformly release seeds received from the seed hopper(s) 58, 60 for deposit within the furrow. For instance, as will be described below, the seed meter 100 may be coupled to a suitable vacuum source 64 (e.g., a blower powered by a motor and associated tubing or hoses) configured to generate a vacuum or negative pressure that attaches the seeds to rotating seed disks of the seed meter 100, which control the rate at which the seeds are output from the seed meter 100 to an associated seed tube 66. As shown in FIG. 2, the seed tube 66 may extend vertically between the seed meter 100 and the ground to facilitate delivery of the seeds output from the seed meter 100 to the furrow.

It should be appreciated that the configuration of the row unit 28 described above and shown in FIG. 2 is provided only to place the present subject matter in an exemplary field of use. Thus, it should be appreciated that the present subject matter may be readily adaptable to any manner of seed planting unit configuration.

Figure 4:
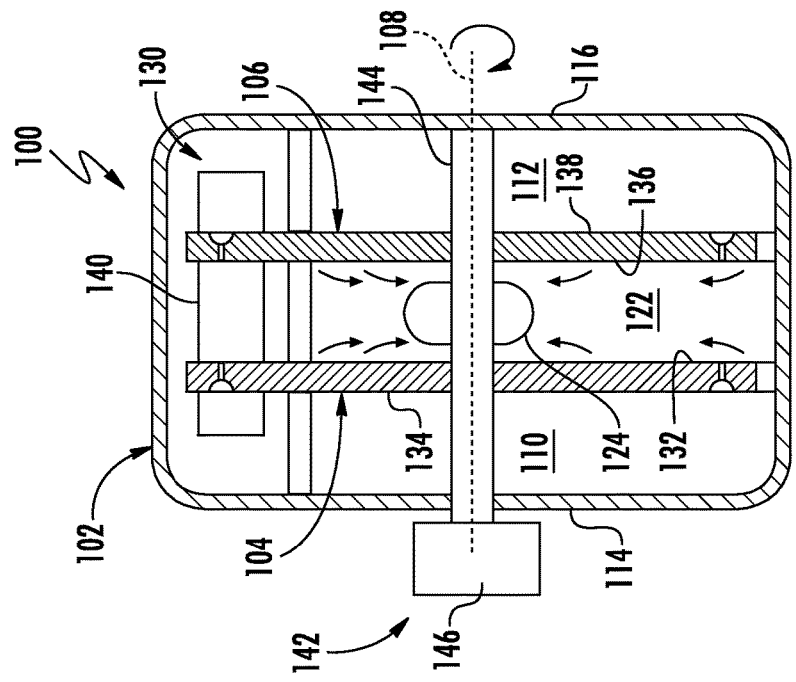
FIG. 4 illustrates another schematic, cross-sectional view of the dual-disk seed meter of the row unit shown in FIG. 2 taken about line 4-4.
Figure 3:
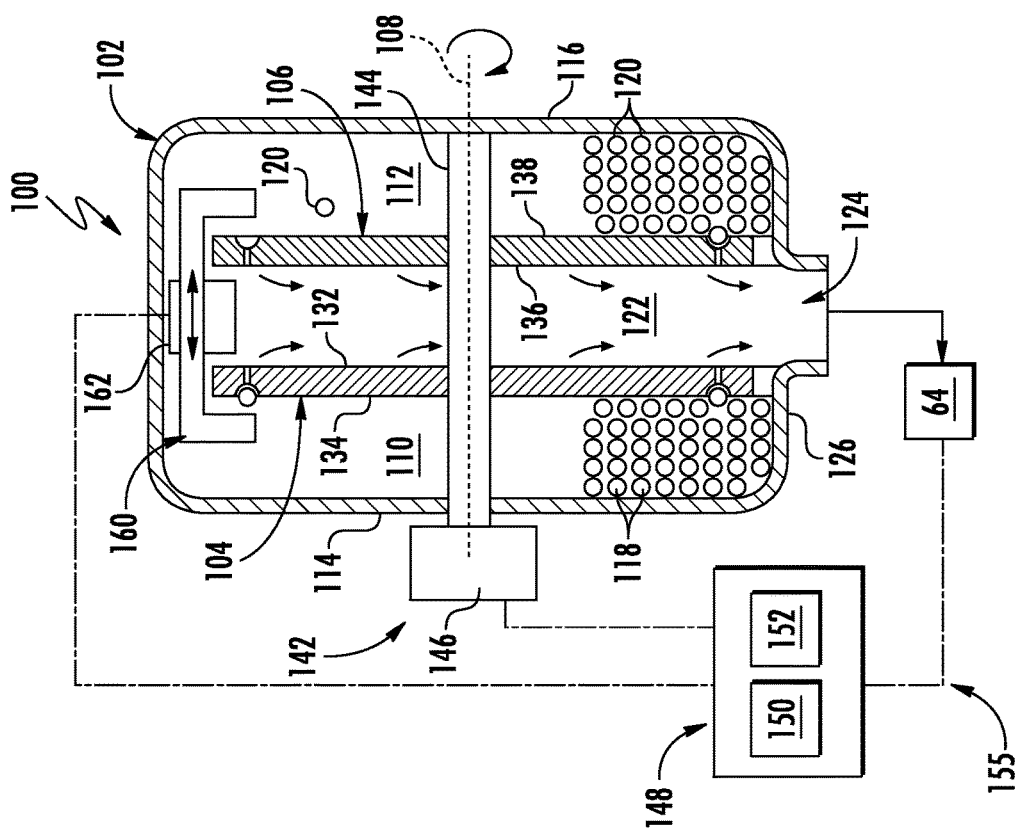
FIG. 3 illustrates a schematic, cross-sectional view of a dual-disk seed meter of the row unit shown in FIG. 2 taken about line 3-3.

Referring now to FIGS. 3 and 4, cross-sectional, schematic views of one embodiment of the dual-disk seed meter 100 shown in FIG. 2 are illustrated in accordance with aspects of the present subject matter, particularly illustrating an example meter configuration for providing absolute and instantaneous switching between seed types being planted (e.g., during a single planting pass). Specifically, FIG. 3 illustrates a cross-sectional, schematic view of the seed meter 100 taken about the vertically oriented section line 3-3 shown in FIG. 2. Additionally, FIG. 4 illustrates a cross-sectional, schematic view of the seed meter 100 taken about the horizontally oriented section line 4-4 shown in FIG. 2.

As shown in FIGS. 3 and 4, the seed meter 100 may generally include an outer housing 102 and a pair of seed disks 104, 106 positioned within the housing 102, such as a first seed disk 104 and a second seed disk 106. The seed disks 104, 106 may generally be rotatable within the housing 102 about an axis of rotation 108. In several embodiments, the seed disks 102, 104 may be spaced apart laterally or axially from opposed sidewalls of the housing 102 along the axis of rotation 108 such that opposed seed chambers 110, 112 are defined within the housing 102. For example, as shown in FIGS. 3, and 4, the first seed disk 104 may be spaced apart axially or laterally from an adjacent first sidewall 114 of the housing 102 such that a first seed chamber 110 is defined between the first sidewall 114 and the first seed disk 104. Similarly, the second seed disk 106 may be spaced apart axially or laterally from an adjacent second sidewall 116 of the housing 102 such that a second seed chamber 112 is defined between the second sidewall 116 and the second seed disk 106. In several embodiments, each seed chamber 110, 112 may be configured to receive seeds, such as seeds of differing seeds types. For example, in one embodiment, the seed chambers 110, 112 may receive seeds of a common plant type but different varieties or types for planting in different variety zones of an agricultural field defined at least in part by characteristics relating to soil type and/or management type. Specifically, as shown in FIG. 3, in one embodiment, the first seed chamber 110 may be configured to receive a plurality of seeds 118 of a first seed type while the second seed chamber 112 may be configured to receive a plurality of seeds 120 of a second seed type.

Although the seeds 118, 120 contained within the opposed seed chambers 110, 112 will generally be described herein as corresponding to different seed "types," it should be appreciated that the description of the different types includes different varieties or hybrids. In other words, the different types of seeds may include not only different varieties of the same plant species, but also different seed products. In this regard, different seed products can include seeds of different species as well as coated and uncoated seeds, such as insecticide coated and non-insecticide coated seeds. The different seed products can also include refuge in a bag seed and non-refuge in a bag seed, plant-parasite resistant seed and non-plant-parasite resistant seed, such as cyst nematodes resistant seeds and non-cyst nematodes resistant seeds, herbicide-tolerant seed and non-herbicide tolerant seed, or other different products.

Additionally, as shown in FIGS. 3 and 4, the seed disks 104, 106 may also be spaced apart from each other along the axis of rotation 108 such that a vacuum chamber 122 is defined directly between the first and second seed disks 104, 106. In such an embodiment, a vacuum port or inlet 124 may be defined through a portion of the housing 106 (e.g., through a bottom wall 126 of the housing 106) to allow the vacuum chamber 122 to be provided in flow communication with a suitable vacuum source 64 (e.g., (e.g., a blower powered by a motor and associated tubing or hoses). As a result, a vacuum or negative pressure may be generated within the vacuum chamber 122 that allows the seeds 118, 120 to be drawn into and held against seed pockets and/or cavities 128 (FIGS. 5 and 6) defined through each seed disk 104, 106, thereby permitting the seeds 110, 112 to be rotatably conveyed through the housing 102 for subsequent release from the seed disks 104, 106 within a discharge section 130 (FIG. 4) of the housing 106. For example, as the first seed disk 104 is rotated within the housing 106, the vacuum applied against a vacuum chamber-side face 132 of the first seed disk 104 may result in the seeds 118 in the first seed chamber 110 being sucked or drawn into the seed cavities 128 defined along the opposed seed-side face 134 of the disk 104 to allow the seeds 118 to be carried by the first seed disk 104 towards the discharge section 130 of the housing 102. Similarly, as the second seed disk 106 is rotated within the housing 102, the vacuum applied against a vacuum chamber-side face 136 of the second seed disk 106 may result in the seeds 120 in the second seed chamber 112 being sucked or drawn into the seed cavities 128 defined along the opposed seed-side face 138 of the seed disk 106 to allow the seeds 120 to be carried by the seed disk 106 towards the discharge section 130 of the housing 106. As shown in FIG. 4, the discharge section 130 of the housing 102 may include a discharge opening or seed outlet 140 for expelling seeds 118, 120 from the seed meter 100 and into the associated seed tube 66 (FIG. 2) for subsequent delivery to the furrow.

Additionally, as shown in FIGS. 3 and 4, the seed meter 100 may also include a drive assembly 142 for rotationally driving the seed disks 104, 106. In several embodiments, the drive assembly 142 may be configured to simultaneously rotate the seed disks 104, 106 within the housing 102. For instance, as shown in the illustrated embodiment, the drive assembly 142 may include a common drive shaft(s) 144 extending through the first and second seed disks 104, 106 along the axis of rotation 108, with each seed disk 104, 106 being coupled to the shaft(s) 144 for rotation therewith. In such an embodiment, the drive assembly 142 may also include a rotational actuator or driver 146 coupled to shaft(s) 144 for rotationally driving the shaft(s) 144 and, thus, the seed disks 104, 106. For example, the rotational driver 146 may correspond to a motor, such as a pneumatic, hydraulic, or electric motor, coupled to the shaft(s) 144 (e.g., by being coupled directly to the shaft(s) 144 or indirectly via one or more components, such as an adapter or a gearbox). In another embodiment, the rotational driver 146 may correspond to a belt-driven or chain-driven system coupled to the shaft(s) 144 via a suitable pulley(s), sprocket(s), and/or the like.

It should be appreciated that, in several embodiments, the operation of one or more components of the seed meter 100 may be configured to be electronically controlled via a suitable controller 148. For example, as shown in FIG. 3, the controller 148 may be communicatively coupled to the vacuum source 64 for controlling the operation of the vacuum source 64, thereby allowing the controller 148 to regulate the pressure within the vacuum chamber 122 to adjust the performance or operation of the seed meter 100. Similarly, as shown in FIG. 3, the controller 148 may also be communicatively coupled to the drive assembly 142 for controlling the rotational speed of the seed disks 104, 106. For example, when the rotational driver 146 corresponds to a motor, the controller 148 may be configured to control the operation of the motor to regulate the rotational speed of the seed disks 104, 106.

In general, the controller 148 may correspond to any suitable processor-based device(s), such as a computing device or any combination of computing devices. Thus, as shown in FIG. 3, the controller 148 may include one or more processor(s) 150 and associated memory devices 152 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 152 may generally comprise memory elements) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 152 may generally, be configured to store information accessible to the processor(s) 150, including data that can be retrieved, manipulated, created and/or stored by the processor(s) 150 and instructions that can be executed by the processor(s) 110.

It should be appreciated that, in one embodiment, the controller 148 may correspond to a vehicle controller of the work vehicle configured to tow the planter 20 or the controller 148 may correspond to an implement controller of the planter 20. Alternatively, the controller 148 may form part of a distributed computer network that includes or is in communication with the vehicle controller and/or the implement controller.

Referring still to FIGS. 3 and 4, the seed meter 100 may also include one or more seed deflectors 160 positioned within the housing 102. As will be described in greater detail below with reference to FIGS. 5 and 6, the seed deflector(s)

160 may be configured to be actuated or moved within the housing 102 relative to the seed disks 104, 106 to allow the seed deflector(s) 160 to serve as a means for controlling which seed type is currently being discharged from the seed meter 100. For instance, when it is desired for the seed meter 100 to deliver seeds from the first seed chamber 110 to the furrow, the seed deflector(s) 160 may be positioned relative to the first and second seed disk(s) 104, 106 such that the seeds 118 conveyed by the first seed disk 104 are allowed to be rotated past the seed deflector(s) 106 and delivered to the discharge section 130 of the housing 102 while the seeds 120 conveyed by the second seed disk 106 are rotated into or otherwise contact a portion of the seed deflector(s) 160, thereby knocking the seeds 120 off of the second seed disk 106 and preventing their delivery to the discharge section 130 of the housing 102. In such operating mode, the seeds 118 of the first seed type contained within the first seed chamber 110 may be discharged from the seed meter 110 into the associated seed tube 66 (FIG. 2) for delivery to the farrow while the seeds 120 of the second seed type contained within the second seed chamber 112 may be decoupled from the second seed disk 106 and fall back down into the second seed chamber 112. Similarly, when it is desired for the seed meter 100 to deliver seeds from the second seed chamber 112 to the furrow, the seed deflector(s) 160 may be positioned relative to the first and second seed disk(s) 104, 106 such that the seeds 120 conveyed by the second seed disk 106 are allowed to be rotated past the seed deflector(s) 160 and delivered to the discharge section 130 of the housing 102 while the seeds 118 conveyed by the first seed disk 104 are rotated into or otherwise contact a portion of the seed deflector(s) 160, thereby knocking the seeds 118 off the first seed disk 104 and preventing their delivery to the discharge section 130 of the housing 102. In such operating mode, the seeds 120 of the second seed type contained within the second seed chamber 112 may he discharged from the seed meter 100 into the associated seed tube 66 for delivery to the furrow while the seeds 118 of the first seed type contained within the first seed chamber 110 may be decoupled from the first seed disk 104 and fall back down into the first seed chamber 110.

As shown in FIG. 3, to allow the seed deflector(s) 160 to be actuated relative to the first and second seed disks 104, 106, a suitable actuator(s) 162 may be coupled to the seed deflector(s) 160. In such an embodiment, the type and configuration of the actuator(s) 162 may generally vary depending on the configuration of the seed deflector(s) 160, including the desired type of motion for the deflector(s) 160. For instance, for a seed deflector(s) configured to be linearly actuated within the housing 102 relative to the seed disks 104, 106, the actuator(s) 162 may correspond to any suitable linear actuator(s). Similarly, for a seed deflector(s) configured to be rotated or pivoted within the housing 102 relative to the seed disks 104, 106, the actuator(s) 162 may correspond to any suitable rotational actuator(s).

Additionally, as shown in FIG. 3, in several embodiments, the seed deflector actuator(s) 162 may be communicatively coupled to the controller 148 to allow the controller 148 to control the operation of the actuator(s) 162, thereby permitting the controller 148 to regulate the position of the seed deflector(s) 160 within the housing 102. As a result, the controller 148 may be configured to automatically adjust the position of the seed deflector(s) 160 relative to the first and second seed disks 104, 106 based on the desired or selected seed type to be discharged from the seed meter 100. For instance, when the controller 148 determines that the first seed type should be discharged from the seed meter 100, the controller 148 may be configured to control the operation of the actuator(s) 162 to adjust the position of the seed deflector(s) 160 within the housing 102 in a manner that permits the seeds 118 within the first seed chamber 110 to be delivered to the discharge section 130 of the housing 102. Similarly, when the controller 148 determines that the second seed type should be discharged from the seed meter 100, the controller 148 may be configured to control the operation of the actuator(s) 162 to adjust the position of the seed deflector(s) 160 within the housing 102 in a manner that permits the seeds 120 within the second seed chamber 112 to be delivered to the discharge section 130 of the housing 102. As will be described below, the selection or determination of the seed type may be made by the controller 148 by referencing a corresponding prescription map (FIG. 11) or based on inputs received from the operator.

It should be appreciated that, in accordance with aspects of the present subject matter, the disclosed seed meter 100 may form all or part of a system 155 for switching between seed types during the performance of a planting operation. For example, the system 155 may include the seed meter 100 and any number of related components described herein, such as the controller 148, the row units 28, the planter 20, and/or any other suitable components described herein.

Figure 5:
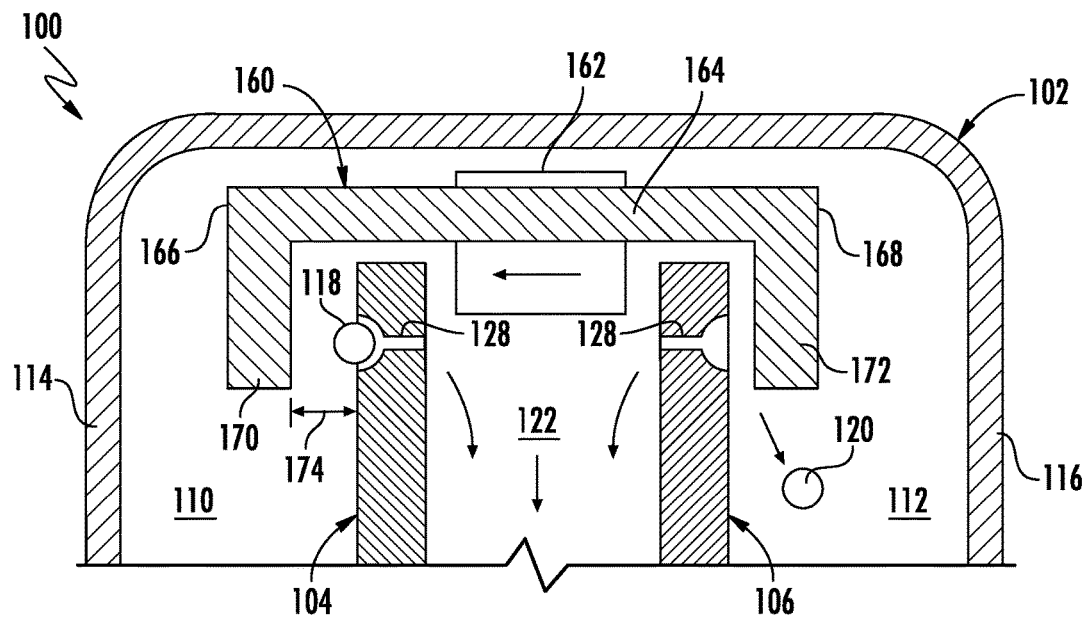
FIG. 5 illustrates a portion of the cross-sectional view of the dual-disk seed meter shown in FIG. 3, particularly illustrating one embodiment of a seed deflector located at a first position relative to the associated seed disks of the seed meter for allowing seeds of a first seed type to be discharged from the meter.
Figure 6:
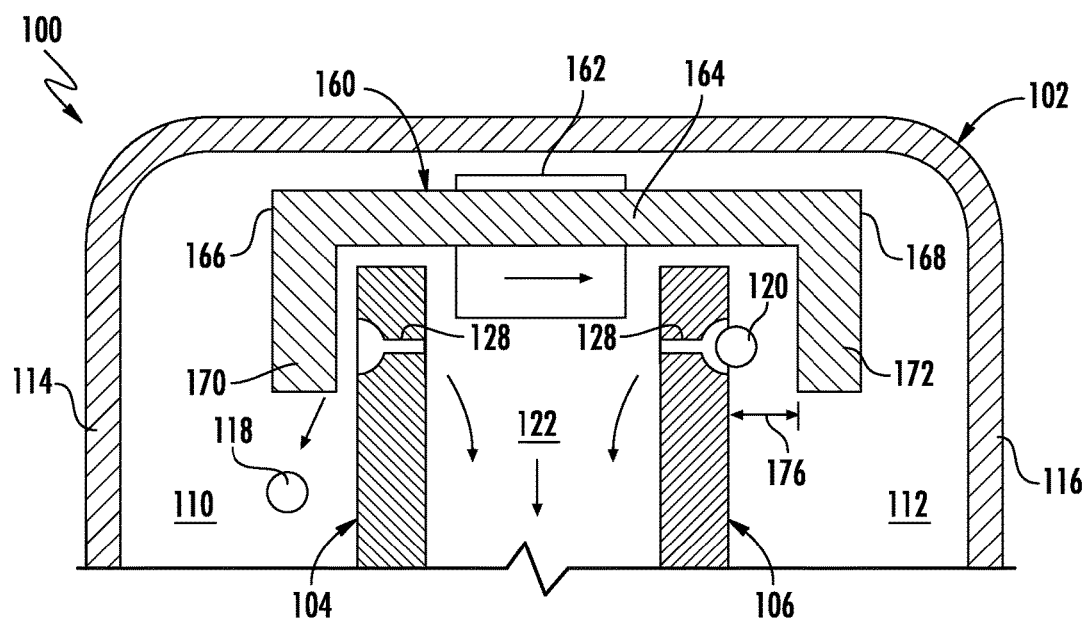
FIG. 6 illustrates the same portion of the cross-sectional view of the dual-disk seed meter shown in FIG. 5, particularly illustrating the seed deflector located at a second position relative to the associated seed disks of the seed meter for allowing seeds of a second seed type to be discharged from the meter.

Referring now to FIGS. 5 and 6, a portion of the cross-sectional, schematic view of the seed meter 100 shown in FIG. 3 is illustrated in accordance with aspects of the present subject matter, particularly illustrating one embodiment of a suitable configuration of a seed deflector 160. Specifically, FIG. 5 illustrates the seed deflector 160 located at a first position relative to the first and second seed disks 104, 106 for allowing seeds 118 contained within the first seed chamber 110 to be discharged from the seed meter 100. Additionally, FIG. 6 illustrates the seed deflector 160 located at a second position relative to the first and second seed disks 104, 106 for allowing seeds 120 contained within the second seed chamber 112 to be discharged from the seed meter 100.

As shown in FIGS. 5 and 6, the seed deflector 160 includes a base portion 164 extending axially or laterally between opposed first and second ends 166, 168. Additionally, the seed deflector 160 includes first and second deflector portions 170, 172 extending outwardly from the opposed ends 166, 168 of the base portion 164, respectively. In such an embodiment, the first deflector portion 170 may be configured to extend outwardly from the base portion 164 to a location proximal to a portion of the first seed disk 104. Similarly, the second deflector portion 172 may be configured to extend outwardly from the base portion 160 to a location proximal to a portion of the second seed disk 106. As will be described below, by linearly actuating the seed deflector 160 within the housing 102, the lateral positioning of the first and second deflector portions 170, 172 relative to the first and second seed disks 104, 106, respectively, may be adjusted to vary the seed type being discharged from the seed meter 100.

For instance, as shown in FIG. 5, when the seed deflector 160 is located at the first position relative to the seed disks 104, 106, the first deflector portion 170 may be spaced apart from the first seed disk 104 by a given lateral spacing distance 174 while the second deflector portion 172 may be disposed directly adjacent to the second seed disk 106. In such an embodiment, the lateral spacing distance 174 may be selected such that the seeds 118 being conveyed past the seed deflector 160 with rotation of the first disk 104 are allowed to pass through the space defined between the first deflector portion 170 and the first seed disk 104 without contacting the seed deflector 160, thereby allowing the seeds 118 to be delivered to the discharge section 130 of the housing 102. In contrast, given the close spatial relationship between the second deflector portion 172 and the second seed disk 106 when the seed deflector 160 is at its first position, the seeds 120 being conveyed towards the seed deflector 160 with rotation of the seed disk 106 may contact the second deflector portion 172 and be knocked off of the seed disk 106, thereby preventing the seeds 120 from being delivered to the discharge section 130 of the housing 102.

Similarly, as shown in FIG. 6, when the seed deflector 160 is located at the second position relative to the seed disks 104, 106, the second deflector portion 172 may be spaced apart from the second seed disk 106 by a given lateral spacing distance 176 while the first deflector portion 170 may be disposed directly adjacent to the first seed disk 105. In such an embodiment, the lateral spacing distance 176 may be selected such that the seeds 120 being conveyed past the seed deflector 160 with rotation of the second disk 106 are allowed to pass through the space defined between the second deflector portion 172 and the second seed disk 106 without contacting the seed deflector 160, thereby allowing the seeds 120 to be delivered to the discharge section 130 of the housing 102. In contrast, given the close spatial relationship between the first deflector portion 170 and the first seed disk 104 when the seed deflector 160 is at its second position, the seeds 118 being conveyed towards the seed deflector 160 with rotation of the seed disk 104 may contact the first deflector portion 170 and be knocked off of the first seed disk 104, thereby preventing the seeds 118 from being delivered to the discharge section 130 of the housing 102.

As indicated above, a suitable actuator 162, such as a linear actuator, may be coupled to the seed deflector 160 to allow the deflector 160 to be moved between its first and second positions. Additionally, as indicated above, the operation of the actuator 162 may be controlled, for example, via the associated controller 148 (FIG. 3) to allow the controller 148 to automatically adjust the position of the seed deflector 160 relative to the first and second seed disks 104, 106.

Figure 7:
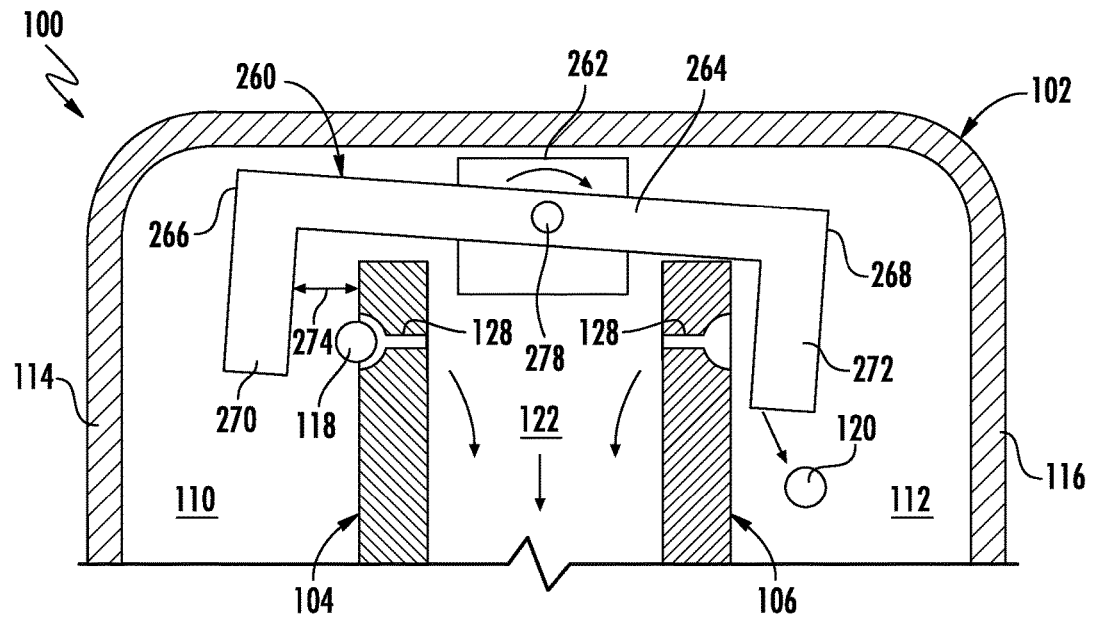
FIG. 7 illustrates another embodiment of a seed deflector suitable for use within the disclosed dual-disk seed meter in accordance with aspects of the present subject matter, particularly illustrating the seed deflector located at a first position relative to the associated seed disks of the seed meter for allowing seeds of a first seed type to be discharged from the meter.
Figure 8:
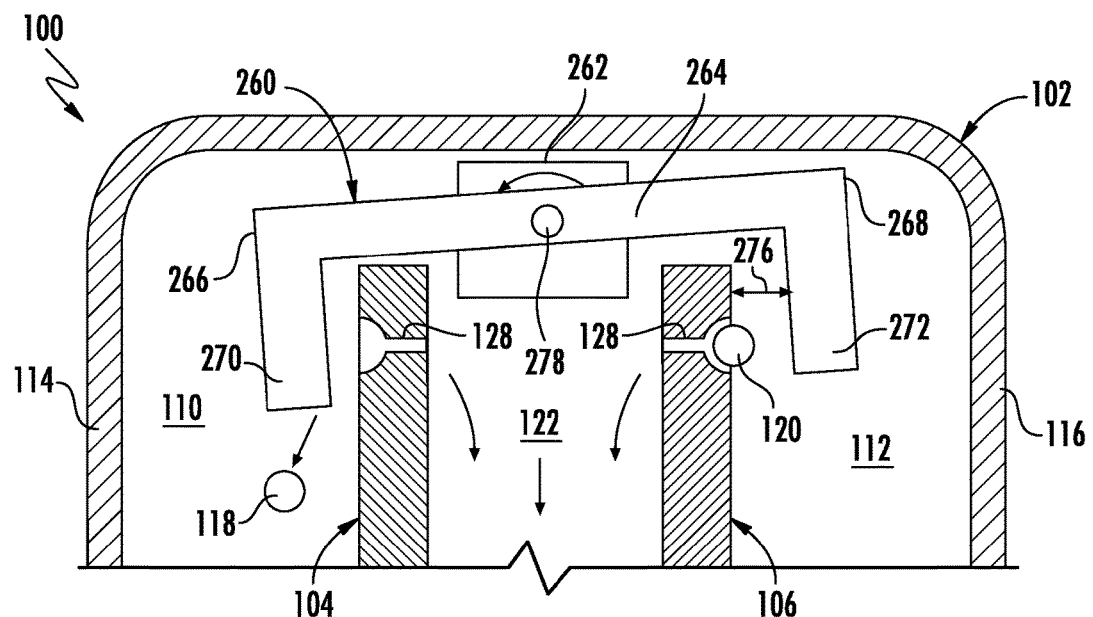
FIG. 8 illustrates another view of the seed deflector shown in FIG. 7, particularly illustrating the seed deflector located at a second position relative to the associated seed disks of the seed meter for allowing seeds of a second seed type to be discharged from the meter.

Referring now to FIGS. 7 and 8, cross-sectional views of another embodiment of a seed deflector 260 suitable for use within the disclosed dual-disk seed meter 100 are illustrated in accordance with aspects of the present subject matter. Specifically, FIG. 7 illustrates the seed deflector 260 located at a first position relative to the first and second seed disks 104, 106 for allowing seeds 118 contained within the first seed chamber 110 to be discharged from the seed meter 100. Additionally, FIG. 8 illustrates the seed deflector 260 located at a second position relative to the first and second seed disks 104, 106 for allowing seeds 120 contained within the second seed chamber 112 to be discharged from the seed meter 100.

As shown in FIGS. 7 and 8, the seed deflector 260 is configured similarly to the seed deflector 160 described above with reference to FIGS. 5 and 6. For example, the seed deflector 260 includes a base portion 264 extending between opposed first and second ends 266, 268. Additionally, the seed deflector 260 includes first and second deflector portions 270, 272 extending outwardly from the opposed ends 266, 268 of the base portion 264, respectively. For example, the first deflector portion 270 may be configured to extend outwardly from the base portion 260 to a location proximal to a portion of the first seed disk 104. Similarly, the second deflector portion 272 may be configured to extend outwardly from the base portion 164 to a location proximal to a portion of the second seed disk 106. However, unlike the linearly actuated seed deflector 160 described above, the seed deflector 260 is configured to be pivoted relative to the seed disks 104, 106 (e.g., about a pivot point 278) to adjust the positioning of the first and second deflector portions 270, 272 relative to the first and second seed disks 104, 106, respectively, thereby allowing the seed deflector 260 to be used as a means for varying the seed type being discharged from the seed meter 100.

For instance, as shown in FIG. 7, when the seed deflector 260 is pivoted to the first position relative to the seed disks 104, 106, the first deflector portion 270 may be spaced apart from the first seed disk 104 by a given lateral spacing distance 274 while the second deflector portion 272 may be disposed directly adjacent to the second seed disk 106. In such an embodiment, the lateral spacing distance 274 may be selected such that the seeds 118 being conveyed past the seed deflector 260 with rotation of the first disk 104 are allowed to pass trough the space defined between the first deflector portion 270 and the first seed disk 104 without contacting the seed deflector 260, thereby allowing the seeds 118 to be delivered to the discharge section 130 of the housing 102. In contrast, given the close spatial relationship between the second deflector portion 272 and the second seed disk 106 when the seed deflector 260 is at its first position, the seeds 120 being conveyed towards the seed deflector 260 with rotation of the seed disk 106 may contact the second deflector portion 272 and be knocked off of the seed disk 106, thereby preventing the seeds 120 from being delivered to the discharge section 130 of the housing 102.

Similarly, as shown in FIG. 8, when the seed deflector 260 is pivoted to the second position relative to the seed disks 104, 106, the second deflector portion 272 may be spaced apart from the second seed disk 106 by a given lateral spacing distance 276 while the first deflector portion 270 may be disposed directly adjacent to the first seed disk 104. In such an embodiment, the lateral spacing distance 276 may be selected such that the seeds 120 being conveyed past the seed deflector 260 with rotation of the second disk 106 are allowed to pass through the space defined between the second deflector portion 272 and the second seed disk 104 without contacting the seed deflector 260, thereby allowing the seeds 120 to be delivered to the discharge section 130 of the housing 102. In contrast, given the close spatial relationship between the first deflector portion 270 and the first seed disk 104 when the seed deflector 260 is at its second position, the seeds 118 being conveyed towards the seed deflector 260 with rotation of the first disk 104 may contact the first deflector portion 270 and be knocked off of the seed disk 104, thereby preventing the seeds 118 from being delivered to the discharge section 130 of the housing 102.

Similar to the embodiment described above, a suitable actuator 262, such a rotational actuator, may be coupled to the seed deflector 260 to allow the deflector 260 to be pivoted about the pivot point 278 between the first and second positions. Additionally, as indicated above, the operation of the actuator 262 may be controlled via the associated controller 148 (FIG. 3) to allow the controller 148 to automatically adjust the position of the seed deflector 260 relative to the first and second seed disks 104, 106.

Figure 9:
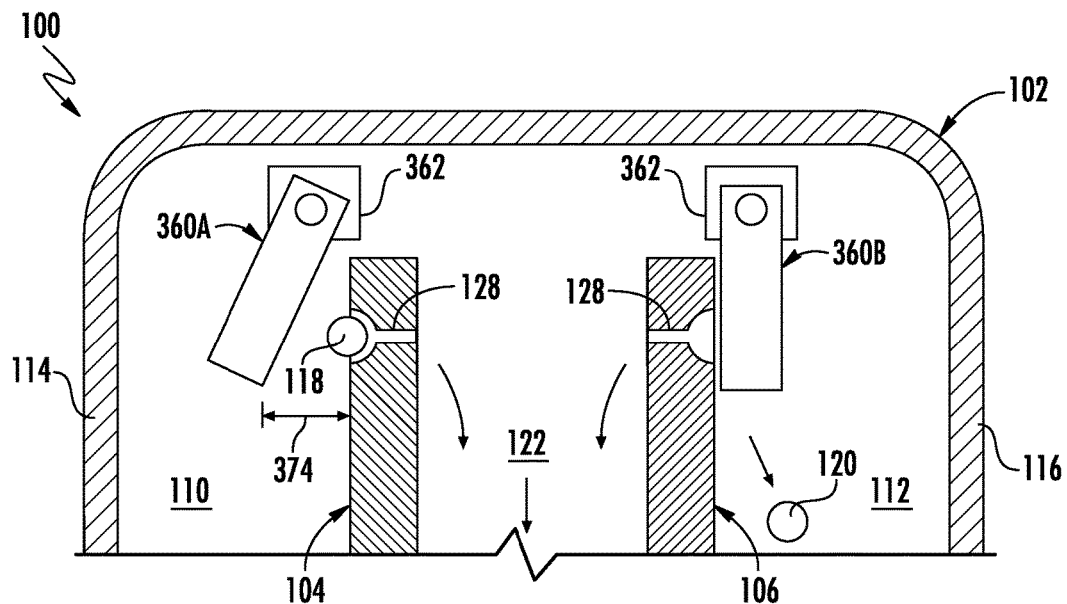
FIG. 9 illustrates a further embodiment of a dual-disk seed meter including two separate seed deflectors in accordance with aspects of the present subject matter, particularly illustrating the seed deflectors located at suitable positions relative to the associated seed disks of the seed meter for allowing seeds of a first seed type to be discharged from the meter.
Figure 10:
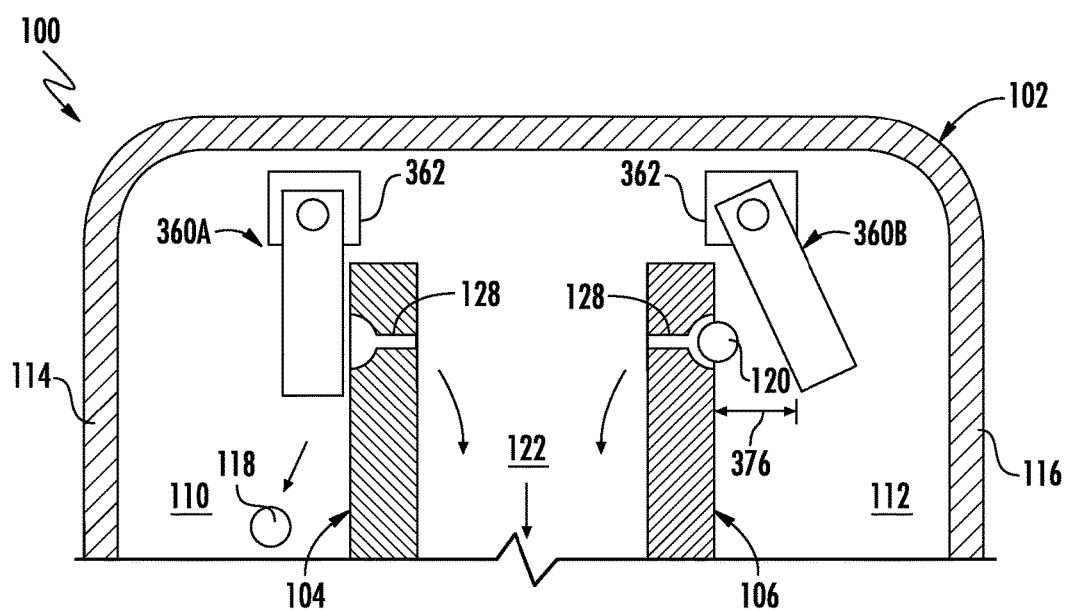
FIG. 10 illustrates another view of the seed deflectors shown in FIG. 9, particularly illustrating the seed deflectors located at suitable positions relative to the associated seed disks of the seed meter for allowing seeds of a second seed type to be discharged from the meter.

Referring now to FIGS. 9 and 10, cross-sectional views of a further embodiment of seed deflectors suitable for use within the disclosed dual-disk seed meter 100 are illustrated in accordance with aspects of the present subject matter, particularly illustrating the seed meter 100 including first and second seed deflectors 360A, 360B configured to be moved relative to the first and second seed disks 104, 106, respectively. Specifically, FIG. 9 illustrates the first seed deflector 360A located at a first position relative to the first seed disk 104 for allowing seeds 118 contained within the first seed chamber 110 to be discharged from the seed meter 100 while the second seed deflector 360B is located at a second position relative to the second seed disk 106 to prevent seeds 120 contained within the second seed chamber 112 from being discharged from the seed meter 100. Additionally, FIG. 10 illustrates the first seed deflector 360A located at a second position relative to the first seed disk 104 to prevent seeds 118 contained within the first seed chamber 110 from being discharged from the seed meter 100 while the second seed deflector 360B is located at a first position relative to the second seed disk 104 for allowing seeds 120 contained within the second seed chamber 112 to be discharged from the seed meter 100.

As shown in FIGS. 9 and 10, unlike the embodiments described above, each seed disk 104, 106 is provided in operative association with a separate seed deflector 360A, 360B for controlling whether the seeds 118, 120 conveyed by each respective disk 104, 106 are allowed to be discharged from the seed meter 100. Specifically, the seed meter 100 includes a first seed deflector 360A movable relative to the first seed disk 104 between a first position (FIG. 9), at which the first seed deflector 360A is spaced apart from the first seed disk by a given lateral spacing distance 374 such that the seeds 118 being conveyed past the seed deflector 360A with rotation of the first disk 104 are allowed to pass through the space defined between the first seed deflector 360A and the first seed disk 104 without contacting the seed deflector 360A, and a second position (FIG. 10), at which the first seed deflector 360A is disposed directly adjacent to the first seed disk 104 such that the seeds 118 being conveyed towards the seed deflector 360A with rotation of the seed disk 104 contact the first seed deflector 360A and are knocked off of the seed disk 104. Additionally, the seed meter 100 includes a second seed deflector 360B movable relative to the second seed disk 106 between a first position (FIG. 10), at which the second seed deflector 360B is spaced apart from the second seed disk 106 by a given lateral spacing distance 376 such that the seeds 120 being conveyed past the seed deflector 360B with rotation of the second disk 106 are allowed to pass through the space defined between the second seed deflector 360B and the second seed disk 106 without contacting the seed deflector 36B, and a second position (FIG. 9), at which the second seed deflector 360B is disposed directly adjacent to the second seed disk 106 such that the seeds 120 being conveyed towards the seed deflector 360B with rotation of the seed disk 106 contact the second seed deflector 360B and are knocked off of the seed disk 106.

With the configuration shown in FIGS. 9 and 10, the positions of the separate seed deflectors 360A, 360B may be adjusted to allow the selected seed type to be discharged from the seed meter 100. For example, when the selected seed type corresponds to the first seed type, the seed deflectors 360A, 360B may be moved to the positions shown in FIG. 9 (e.g. with the first seed deflector 360A at its first position and the second seed deflector 360B at its second position) to allow the seeds 118 from the first seed chamber 110 to be discharged from the meter 100 while the seeds 120 from the second seed chamber 112 are knocked off of the second seed disk 106 via the second seed 360B. Similarly, when the selected seed type corresponds to the second seed type, the seed deflectors 360A, 360B may be moved to the positions shown in FIG. 10 (e.g. with the first seed deflector 360A at its second position and the second seed deflector 360B at its first position) to allow the seeds 120 from the second seed chamber 112 to be discharged from the meter 100 while the seeds 118 from the first seed chamber 120 are knocked off of the first seed disk 104 via the first seed deflector 360A.

Similar to the embodiments described above, a suitable actuator(s) 362 may be coupled to each seed deflector 360A, 360B to allow the deflectors 360A, 360b to be actuated between their first and second positions. As shown in FIGS. 9 and 10, in one embodiment, each deflector 360A, 360B may be coupled to a separate actuator 362. Alternatively, a common actuator 362 may be coupled to the seed deflectors 360A, 360B for actuating the deflectors 360A, 360B to be actuated between their first and second positions. Additionally, as indicated above, the operation of the actuator(s) 362 may be controlled via the associated controller 148 (FIG. 3) to allow the controller 148 to automatically adjust the position of each seed deflector 360A, 360B relative to its corresponding seed disk 104, 106.

Figure 11:
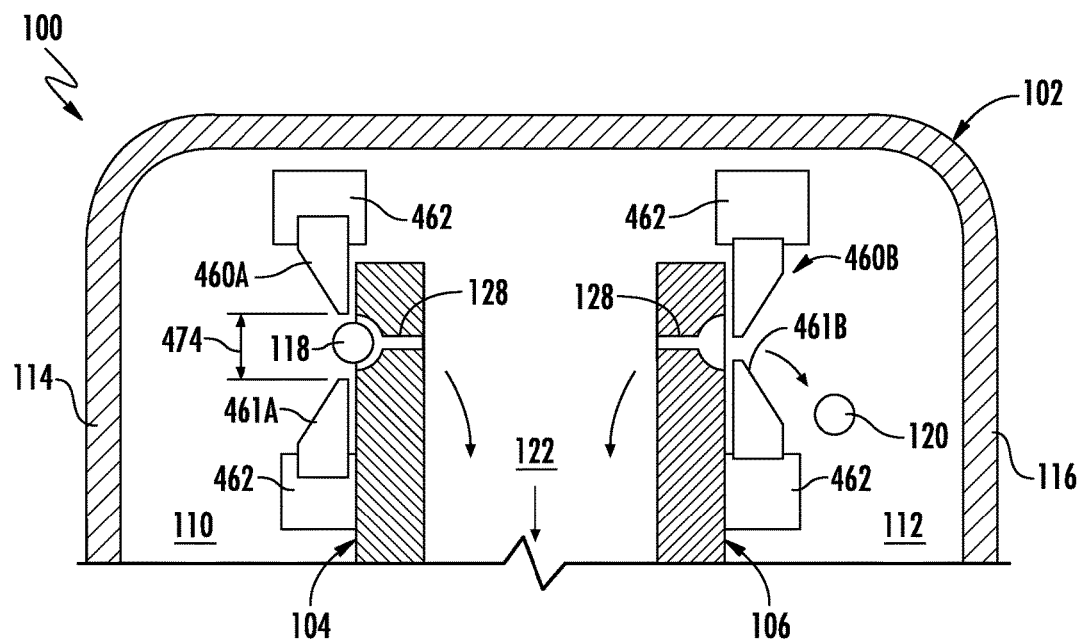
FIG. 11 illustrates yet another embodiment of a dual-disk seed meter including separate seed deflectors provided in association with each disk in accordance with aspects of the present subject matter, particularly illustrating the seed deflectors located at suitable positions relative to the associated seed disks of the seed meter for allowing seeds of a first seed type to be discharged from the meter.
Figure 12:
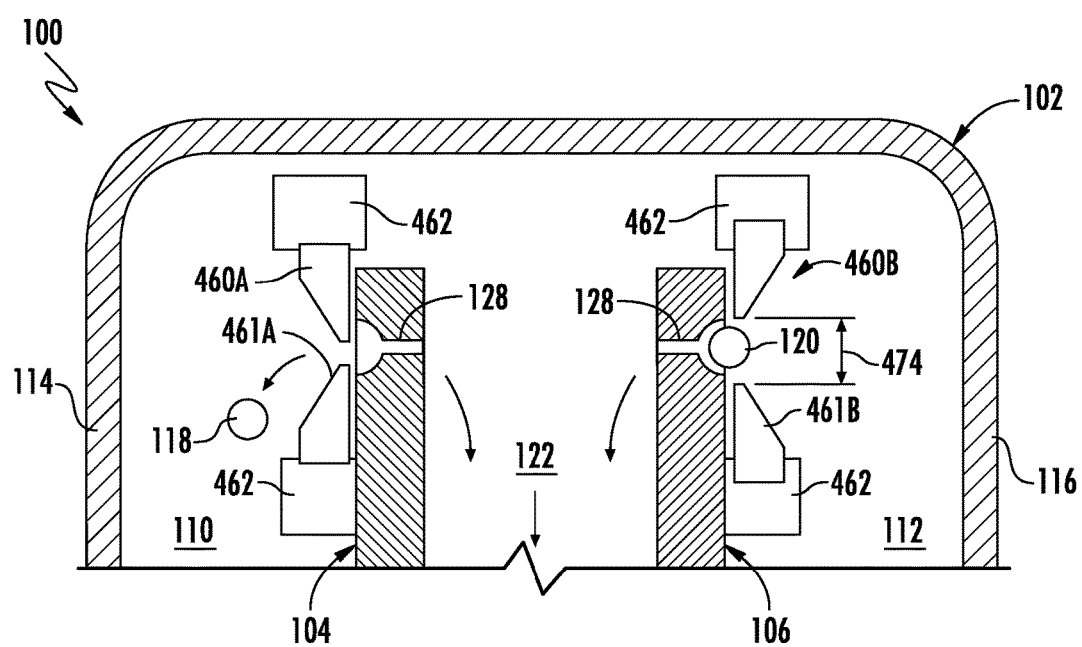
FIG. 12 illustrates another view of the seed deflectors shown in FIG. 11, particularly illustrating the seed deflectors located at suitable positions relative to the associated seed disks of the seed meter for allowing seeds of a second seed type to be discharged from the meter.

Referring now to FIGS. 11 and 12, cross-sectional views of yet another embodiment of seed deflectors suitable for use within the disclosed dual-disk seed meter 100 are illustrated in accordance with aspects of the present subject matter, particularly illustrating the seed meter 100 including both a first pair of seed deflectors (e.g., first upper and lower seed deflectors 460A, 461A) and a second pair of seed deflectors (e.g., second upper and lower seed deflectors 460B, 461B) configured to be moved relative to the first and second seed disks 104, 106, respectively. Specifically, FIG. 11 illustrates the first pair of seed deflectors 460A, 461A located at suitable first positions relative to the first seed disk 104 for allowing seeds 118 contained within the first seed chamber 110 to be discharged from the seed meter 100 while the second pair of seed deflectors 460B, 461B are located at suitable second positions relative to the second seed disk 106 to prevent seeds 120 contained within the second seed chamber 112 from being discharged from the seed meter 100. Additionally, FIG. 12 illustrates the first pair of seed deflectors 460A, 461A located at suitable second positions relative to the first seed disk 104 to prevent seeds 118 contained within the first seed chamber 110 from being discharged from the seed meter 100 while the second pair of seed deflectors 460B, 461B are located at suitable first positions relative to the second seed disk 104 for allowing seeds 120 contained within the second seed chamber 112 to be discharged from the seed meter 100.

As shown in FIGS. 11 and 12, similar to the embodiment described above with reference, to FIGS. 9 and 10, each seed disk 104, 106 is provided in operative association with separate seed deflectors 460A, 460B, 461A, 461B for controlling whether the seeds 118, 120 conveyed by each respective disk 104, 106 are allowed to be discharged from the seed meter 100. Specifically, the seed meter 100 includes first upper and lower seed deflectors 460A, 461A movable radially inwardly and outwardly relative to the first seed disk 104 between a first position (FIG. 11), at which the first upper and lower seed deflectors 460A, 461A are spaced radially apart from the location of the seed cells 128 of the first seed disk 104 (e.g., by aligning the upper and lower seed deflectors 460A, 461A at the upper and lower edges, respectively, of the seed cells 128) such that the seeds 118 being conveyed past the seed deflectors 460A, 461A with rotation of the first disk 104 are allowed to pass through the radial space defined between the first upper and lower seed deflectors 460A, 461A without contacting either deflector 460A, 461A, and a second position (FIG. 12), at which one or both of the first upper and lower seed deflectors 460A, 461A radially overlap the radial location of the seed cells 128 such that the seeds 118 being conveyed towards such deflector(s)

460A, 461A with rotation of the seed disk 104 contact the deflector(s) 460A, 461A and are knocked off of the seed disk 104. Additionally, the seed meter 100 includes second upper and lower seed deflectors 460B, 461B movable relative to the second seed disk 106 between a first position (FIG. 12), at which the second upper and lower seed deflectors 460B, 461B are spaced radially apart from the location of the seed cells 128 of the second seed disk 106 (e.g., by aligning the upper and lower seed deflectors 460B, 461B at the upper and lower edges, respectively, of the seed cells 128) such that the seeds 120 being conveyed past the seed deflectors 460B, 461B with rotation of the second disk 106 are allowed to pass through the radial space defined between the seed deflectors 460B, 461B without contacting either deflector 460B, 461B, and a second position (FIG. 11), at which one or both of the second upper and lower seed deflectors 460B, 461B radially overlap the radial location of the seed cells 128 such that the seeds 120 being conveyed towards the such seed deflector(s) 460B, 461B with rotation of the seed disk 106 contact the deflector(s) 460B, 461B and are knocked off of the seed disk 106.

With the configuration shown in FIGS. 11 and 12, the positions of the pairs of seed deflectors 460A, 460B, 461A, 461B may be adjusted to allow the selected seed type to be discharged from the seed meter 100. For example, when the selected seed type corresponds to the first seed type, the seed deflectors 460A, 460B, 461A, 461B may be moved to the positions shown in FIG. 11 (e.g. with the first upper and lower seed deflectors 460A, 461A at their first positions and the second upper and lower seed deflectors 460B, 461B at their second positions) to allow the seeds 118 from the first seed chamber 110 to be discharged from the meter 100 while the seeds 120 from the second seed chamber 112 are knocked off of the second seed disk 106 via one or both of the second seed deflectors 460B, 461B. Similarly, when the selected seed type corresponds to the second seed type, the seed deflectors 460A, 460B, 461A, 461B may be moved to the positions shown in FIG. 12 (e.g. with the first upper and lower seed deflectors 460A, 461A at their second positions and the second upper and lower seed deflectors 460B, 461B at their first positions) to allow the seeds 120 from the second seed chamber 112 to be discharged from the meter 100 while the seeds 118 from the first seed chamber 120 are knocked off of the first seed disk 104 via one or both of the first seed deflectors 460A, 461A.

As shown in the illustrated embodiment, when each pair of seed deflectors 460A, 460B, 461A, 461B is moved to the second position, both seed deflector of such pair are shown as radially overlapping the location of the seed cells 128. However, in other embodiments, only one of the seed deflectors (e.g., either the upper or lower deflector of each pair) may be configured to be actuated to the second position to deflect seeds from the associated seed disk. In such an embodiment, the other seed deflector may be maintained at its first position.

Additionally, in the illustrated embodiment, the upper and lower deflectors of each pair of seed deflectors 460A, 460B, 461A, 461B are shown as being circumferentially aligned with each other in relation to the adjacent seed disk. However, in other embodiments, the upper and lower deflectors of each pair of seed deflectors 460A, 460B, 461A, 461B may be circumferentially offset from each other relative to the adjacent seed disk such that the seed cells 128 of such disk encounter one of the seed deflectors prior to the other with rotation of the disk.

Moreover, it should be appreciated that, in one embodiment, each pair of seed deflectors 460A, 460B, 461A, 461B may also be configured to function as a singulator for the seed meter 100. For instance, when at the first position, each pair of seed deflectors 460A, 460B, 461A, 461B may be configured to disposed relative to the seed cells 128 of the adjacent seed disk (e.g., at locations adjacent to the upper and lower edges of the cells 128) so as prevent more than one seed from passing through the radial space defined between the adjacent deflectors. In such an embodiment, a radial distance 474 defined between each pair of seed deflectors 460A, 460B, 461A, 461B when at their first position may be selected as corresponding to a suitable singulation distance for the specific seed type being conveyed by each seed disk.

Referring still to FIGS. 11 and 12, similar to the embodiments described above, a suitable actuator(s) 462 may be coupled to each seed deflector 460A, 460B, 461A, 461B to allow the deflectors 460A, 460B, 461A, 461B to be actuated between their first and second positions. As shown in FIGS. 11 and 12, in one embodiment, each deflector 460A, 460B, 461A, 461B may be coupled to a separate actuator 462. Alternatively, a common actuator 462 may be coupled to each pair of seed deflectors 460A, 460B, 461A, 461B for actuating the deflectors between their first and second positions. Additionally, as indicated above, the operation of the actuator(s) 462 may be controlled via the associated controller 148 (FIG. 3) to allow the controller 148 to automatically adjust the position of each seed deflector 460A, 460B, 461A, 461B relative to its corresponding seed disk 104, 106.

Figure 13:
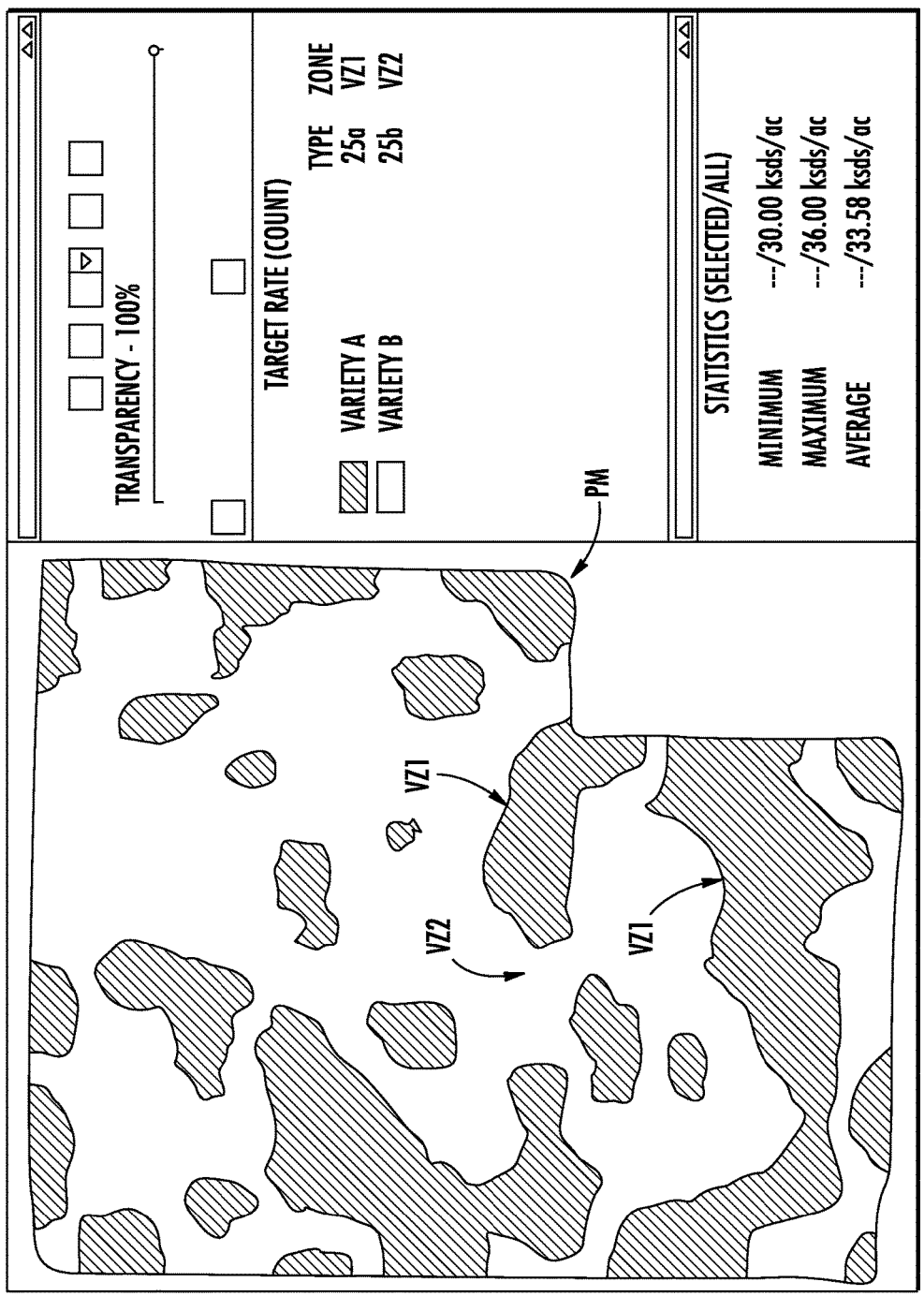
FIG. 13 illustrates an example view of one embodiment of a prescription map that may be used for controlling the operation of the disclosed dual-disk seed meter to allow switching between seed types during the performance of a planting operation.

As indicated above, in one embodiment, the controller 148 may be configured to adjust the position of the seed deflector(s) 160, 260, 360A, 360B, 460A, 460B, 461A, 461B based on a prescription map stored within its memory 152. For example, FIG. 13 illustrates an example view of a seed type or variety prescription map PM. As shown, the prescription map PM indicates which type or variety zones VZ1, VZ2 are where in the agricultural field and which seed types can be planted in the variety zones VZ1, VZ2. As shown in FIG. 13, in this embodiment, the first seed type 118 is shown as being acceptable for use in variety zone VZ1, corresponding to recommended variety A. Similarly, the second seed type 120 is shown as acceptable for use in variety zone VZ2; corresponding to a recommended variety B. In such an embodiment, the operator may input into the controller 148 which seed type 118, 120 is stored in each seed:tank 30 and/or hopper 58, 60 through a suitable user interface. The controller 148 may then automatically control the operation of the seed meter 100, including adjusting the position of the seed deflector(s) 160, 260, 360A, 360B, 460A, 460B, 461A, 461B within the housing 100, based on the prescription map to ensure that the appropriate seed type is planted at each location across the field. For example, as is generally understood, the controller 148 may be communicatively coupled to a GPS-device or other suitable positioning device that allows the controller 148 to monitor the position of the planter 20 within the field. Thus, by determining via the GPS data that the planter 20 is moving across a boundary defined between variety zones requiring differing seed types to be planted, the controller 148 may automatically adjust the position of the seed deflector(s) 160, 260, 360A, 360B, 460A, 460B, 461A, 461B to immediately switch or transition to the required seed type.

Alternatively, the controller 148 may be configured to switch between different seed types based on inputs received from the operator. For instance, the operator may be utilize a suitable input device (e.g., an input device located within the cab of the vehicle towing the planter 20) to instruct the controller 148 to switch between seed types. In such instance, the operator may be provide the input based on a visual assessment of the location of the planter 20 within the field or based on any other suitable data available to the operator. For example, in one embodiment, a prescription map (e.g., similar to the map PM shown in FIG. 13) may be displayed to the operator to allow him/her to determine when to instruct the controller 148 to switch the seed type being delivered via the seed meter 100.

As indicated above, the present subject matter is also directed to a method for switching between seed types during a planting operation using utilizing one or more embodiments of the dual-disk seed meter described herein. For instance, in one embodiment, the method may include rotating first and second seed disks within a housing of a seed meter and positioning at least one seed deflector within the housing such that first seeds of a first seed type conveyed by the first seed disk remain coupled to the first seed disk for discharge from the seed meter and second seeds of a second seed type conveyed by the second seed disk contact the seed deflector(s) and fall back down into the second seed chamber. Additionally, the method may include adjusting the position of the seed deflector(s) within the housing when switching from the first seed type to the second seed type such that the second seeds remain coupled to the second seed disk for discharge from the seed meter and the first seeds contact the seed deflector(s) and fall back down into the first seed chamber.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. dual-disk seed meter for a planter, the dual-disk seed meter comprising:
    a housing defining a first seed chamber configured to receive a plurality of first seeds of a first seed type and a second seed chamber configured to receive a plurality of second seeds of a second seed type;
    a first seed disk rotatable within the housing to convey the first seeds from the first seed chamber;
    a second seed disk rotatable within the housing to convey the second seeds from the second seed chamber;
    a drive assembly configured to simultaneously rotate the first and second seed disks relative to the housing; and
    a seed deflector positioned within the housing and movable relative to at least one the first seed disk or the second seed disk to control which of the first and second seed types is discharged from the housing based on a selected seed type to be delivered by the seed meter.

2. The dual-disk seed meter of claim 1, wherein, when the selected seed type is the first seed type, the seed deflector is moveable to a first position such that the first seeds remain coupled to the first seed disk as the first seeds are conveyed past the seed deflector with rotation of the first seed disk, and wherein, when the selected seed type is the second seed type, the seed deflector is moveable to a second position such that the first seeds conveyed towards the seed deflector with rotation of the first seed disk contact the seed deflector and fall back down into the first seed chamber.

3. The dual-disk seed meter of claim 2, wherein, when in the first position, the seed deflector is disposed relative to the second seed disk such that the second seeds conveyed towards the seed deflector with rotation of the second seed disk contact the seed deflector and fall back down into the second seed chamber and, when in the second position, the seed deflector is disposed relative to the second seed disk such that the second seeds remain coupled to the second seed disk as the second seeds are conveyed past e seed deflector with rotation of the second seed disk.

4. The dual-disk seed meter of claim 3, wherein the seed deflector includes a first deflector portion configured to be positioned relative to the first seed disk and a second deflector portion configured to be positioned relative to the second seed disk.

5. The dual-disk seed meter of claim 4, wherein, when the seed deflector is at the first position, the first deflector portion is spaced apart from the first seed disk a spacing distance to allow the first seeds to pass by the first deflector portion with rotation of the first seed disk without contacting the first deflector portion and the second deflector portion is positioned directly adjacent to the second seed disk such that the second seeds conveyed towards the second deflector portion with rotation of the second seed disk contact the second deflector portion and fall back down into the second seed chamber.

6. The dual-disk seed meter of claim 4, wherein, when the seed deflector is at the second position, the first deflector portion is positioned directly adjacent to the first seed disk such that the first seeds conveyed towards the first deflector portion with rotation of the first seed disk contact the first deflector portion and fall back down into the first seed chamber and the second deflector portion is spaced apart from the second seed disk a spacing distance to allow the second seeds to pass by the second deflector portion with rotation of the first seed disk without contacting the second deflector portion.

7. The dual-disk seed meter of claim 2, wherein the seed deflector comprises a first seed deflector movable relative to the first seed disk between the first and second positions and further comprising a second seed deflector movable relative to the second seed disk between third and fourth positions.

8. The dual-disk seed meter of claim 7, wherein, when the selected seed type is the first seed type, the second seed deflector is moved to the third position such that the second seeds conveyed towards the second seed deflector with rotation of the second seed disk contact the second seed deflector and fall back down into the second seed chamber, and wherein, when the selected seed type is the second seed type, the second seed deflector is moved to the fourth position such that the second seeds remain coupled to the second seed disk as the second seeds are conveyed past the second seed deflector with rotation of the second seed disk.

9. The dual-disk seed meter of claim 2, wherein the seed deflector comprises a first upper seed deflector movable relative to the first seed disk, further comprising a first lower seed deflector movable relative to the first seed disk, the first upper and lower seed deflectors configured to be spaced radially apart from each other when at the first position.

10. The dual-disk seed meter of claim 9, further comprising a second seed deflector separate from the seed deflector, the second seed deflector including second upper and lower seed deflectors movable relative to the second seed disk.

11. A dual-disk seed meter for a planter, the dual-disk seed meter comprising:

a housing defining a first seed chamber configured to receive a plurality of first seeds of a first seed type and a second seed chamber configured to receive a plurality of second seeds of a second seed type;

a first seed disk rotatable within the housing to convey the first seeds from the first seed chamber;

a second seed disk rotatable within the housing to convey the second seeds from the second seed chamber;

a drive assembly configured to simultaneously rotate the first and second seed disks relative to the housing; and a seed deflector movable relative to at least one the first seed disk or the second seed disk to control which of the first and second seed types is discharged from the housing based on a selected seed type to be delivered by the seed meter, wherein the seed deflector is configured to knock off at least one of the first seeds or the second seeds from the at least one of the first seed disk or the second seed disk, respectively, based on the selected seed type to be delivered by the seed meter.

12. The dual-disk seed meter of claim 11, wherein, when the selected seed type is the first seed type, the seed deflector is moveable to a first position such that the first seeds remain coupled to the first seed disk as the first seeds are conveyed past the seed deflector with rotation of the first seed disk, and wherein, when the selected seed type is the second seed type, the seed deflector is moveable to a second position such that the first seeds conveyed towards the seed deflector with rotation of the first seed disk contact the seed deflector and fall back down into the first seed chamber.

13. The dual-disk seed meter of claim 12, wherein, when in the first position, the seed deflector is disposed relative to the second seed disk such that the second seeds conveyed towards the seed deflector with rotation of the second seed disk contact the seed deflector and fall back down into the second seed chamber and, when in the second position, the seed deflector is disposed relative to the second seed disk such that the second seeds remain coupled to the second seed disk as the second seeds are conveyed past the seed deflector with rotation of the second seed disk.

14. The dual-disk seed meter of claim 13, wherein the seed deflector includes a first deflector portion configured to be positioned relative to the first seed disk and a second deflector portion configured to be positioned relative to the second seed disk.

15. The dual-disk seed meter of claim 14, wherein, when the seed deflector is at the first position, the first deflector portion is spaced apart from the first seed disk a spacing distance to allow the first seeds to pass by the first deflector portion with rotation of the first seed disk without contacting the first deflector portion and the second deflector portion is positioned directly adjacent to the second seed disk such that the second seeds conveyed towards the second deflector portion with rotation of the second seed disk contact the second deflector portion and fall back down into the second seed chamber.

16. The dual-disk seed meter of claim 14, wherein, when the seed deflector is at the second position, the first deflector portion is positioned directly adjacent to the first seed disk such that the first seeds conveyed towards the first deflector portion with rotation of the first seed disk contact the first deflector portion and fall back down into the first seed chamber and the second deflector portion is spaced apart from the second seed disk a spacing distance to allow the second seeds to pass by the second deflector portion with rotation of the first seed disk without contacting the second deflector portion.

17. The dual-disk seed meter of claim 12, wherein the seed deflector comprises a first seed deflector movable relative to the first seed disk between the first and second positions and further comprising a second seed deflector movable relative to the second seed disk between third and fourth positions.

18. The dual-disk seed meter of claim 17, wherein, when the selected seed type is the first seed type, the second seed deflector is moved to the third position such that the second seeds conveyed towards the second seed deflector with rotation of the second seed disk contact the second seed deflector and fall back down into the second seed chamber, and wherein, when the selected seed type is the second seed type, the second seed deflector is moved to the fourth position such that the second seeds remain coupled to the second seed disk as the second seeds are conveyed past the second seed deflector with rotation of the second seed disk.

19. The dual-disk seed meter of claim 12, wherein the seed deflector comprises a first upper seed deflector movable relative to the first seed disk, further comprising a first lower seed deflector movable relative to the first seed disk, the first upper and lower seed deflectors configured to be spaced radially apart from each other when at the first position.

20. The dual-disk seed meter of claim 19, further comprising a second seed deflector separate from the seed deflector, the second seed deflector including second upper and lower seed deflectors movable relative to the second seed disk.

* * * * *